United States Patent
Sharma et al.

(10) Patent No.: US 12,503,567 B2
(45) Date of Patent: Dec. 23, 2025

(54) PROCESS FOR RECYCLING A POLYURETHANE MATERIAL

(71) Applicant: Huntsman International LLC, The Woodlands, TX (US)

(72) Inventors: Amit Sharma, The Woodlands, TX (US); Daniel Heberer, The Woodlands, TX (US)

(73) Assignee: HUNTSMAN INTERNATIONAL LLC

(*) Notice: Subject to any disclaimer, the term of this patent is extended or adjusted under 35 U.S.C. 154(b) by 568 days.

(21) Appl. No.: 17/926,335

(22) PCT Filed: May 12, 2021

(86) PCT No.: PCT/US2021/031900
§ 371 (c)(1),
(2) Date: Nov. 18, 2022

(87) PCT Pub. No.: WO2021/236385
PCT Pub. Date: Nov. 25, 2021

(65) Prior Publication Data
US 2023/0183444 A1    Jun. 15, 2023

Related U.S. Application Data

(60) Provisional application No. 63/027,134, filed on May 19, 2020.

(51) Int. Cl.
*C08J 11/26* (2006.01)

(52) U.S. Cl.
CPC ............ *C08J 11/26* (2013.01); *C08J 2375/08* (2013.01)

(58) Field of Classification Search
CPC ....... C08J 11/14–18; C08J 11/22; C08J 11/26; C08J 2375/04–16
See application file for complete search history.

(56) References Cited

U.S. PATENT DOCUMENTS

| | | | |
|---|---|---|---|
| 6,020,386 A * | 2/2000 | Munzmay | C08J 11/22 528/229 |
| 6,090,862 A | 7/2000 | Tatsuda et al. | |
| 6,750,260 B2 | 6/2004 | Sendijarevic | |
| 6,861,568 B1 | 3/2005 | Guffey et al. | |
| 8,906,974 B2 | 12/2014 | Glos et al. | |
| 9,815,808 B2 | 11/2017 | Hillmyer et al. | |
| 2016/0311961 A1 | 10/2016 | Klostermann et al. | |

FOREIGN PATENT DOCUMENTS

| | | | |
|---|---|---|---|
| EP | 0031538 B1 | 11/1985 | |
| EP | 0835901 A2 * | 4/1998 | C08G 18/40 |
| WO | 2000039206 A1 | 7/2000 | |

OTHER PUBLICATIONS

European Search Report issued in corresponding EP Application No. 21808452.3.
Patent Cooperation Treaty International Search Report pertaining to International Application No. PCT/US2021/031900; International Filing Date: May 12, 2021; Date of Mailing: Aug. 3, 2021.
Patent Cooperation Treaty International Written Opinion pertaining to International Application No. PCT/US2021/031900; International Filing Date: May 12, 2021; Date of Mailing: Aug. 3, 2021.

* cited by examiner

*Primary Examiner* — Stephen E Rieth

(57) ABSTRACT

A process for recycling a polyurethane material wherein the polyurethane material comprises a moiety that is capable of undergoing decomposition through acidolysis, the process comprising: contacting the polyurethane material with an acid solution and allowing at least a portion of the polyurethane material to decompose into a recovered raw material composition comprising a degradation compound; and introducing an acetoacetylated polyol into the recovered raw material composition and reacting the acetoacetylated polyol with the degradation compound to form a polyol compound.

19 Claims, No Drawings

PROCESS FOR RECYCLING A POLYURETHANE MATERIAL

CROSS-REFERENCE TO RELATED APPLICATIONS

This application is a national phase of International Application No. PCT/US2021/031900 filed May 12, 2021, which designates the U.S. and claims priority to U.S. Provisional Application No. 63/027,134 filed May 19, 2020. The noted applications are incorporated herein by reference.

BACKGROUND

Field

The present disclosure relates generally to a process for recycling a polyurethane material. More specifically, the present disclosure is directed to a process for recycling a polyurethane material that comprises a moiety capable of undergoing decomposition through acidolysis.

Background

Polyurethane materials are used in numerous applications spanning a variety of industries due to their robustness, longevity, and ability to be tailored for specific end-use applications. Moreover, polyurethane materials are more environmentally friendly when compared to some plastic materials used in industry due to its recyclability when compared to those plastic solutions as well as their use in energy conserving end-use applications such as insulation (e.g., building and pipe insulation) and light weighting of components.

While polyurethane materials may be recycled using a number of techniques known in the art, such as mechanical recycling and chemical recycling (e.g., glycolysis, hydrolysis, pyrolysis, and hydrogenation), there still is a need in the polyurethane industry to develop other processes that ease the recyclability of polyurethane materials thereby reducing the total amount of energy, time, machinery, and reagents needed to recycle such materials.

DETAILED DESCRIPTION

As used herein, unless otherwise expressly specified, all numbers such as those expressing values, ranges, amounts or percentages may be read as if prefaced by the word "about", even if the term does not expressly appear. Plural encompasses singular and vice versa.

As used herein, "plurality" means two or more while the term "number" means one or an integer greater than one.

As used herein, "includes" and like terms means "including without limitation."

As used herein, "molecular weight" means weight average molecular weight ($M_w$) as determined by Gel Permeation Chromatography unless otherwise stated.

When referring to any numerical range of values, such ranges are understood to include each and every number and/or fraction between the stated range minimum and maximum. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

Unless otherwise stated herein, reference to any compounds shall also include any isomers (e.g., stereoisomers) of such compounds.

Process Overview

Polyurethane materials may be recycled using any number of techniques known to those skilled in the art. As stated above, those techniques include both mechanical recycling and chemical recycling. While the recycling techniques can be effective in salvaging a polyurethane material, the present disclosure is directed toward solving the inherent shortcomings of those techniques.

Accordingly, in one embodiment, the present disclosure is directed to a process for recycling a polyurethane material wherein the polyurethane material comprises a moiety (e.g., in its polymeric backbone) that is capable of undergoing decomposition/degradation through acidolysis. Examples of suitable moieties that can under acidolysis include esters, amides, thioesters, imides, carbamate, acetal, alkyl chloride, nitrate, lactam, lactone, sulfonamide, or combinations thereof. Specifically, the process comprises: contacting the polyurethane material with an acid solution and allowing at least a portion of the polyurethane material to decompose into a recovered raw material composition comprising: (i) a degradation compound; and introducing an acetoacetylated polyol into the recovered raw material composition and reacting the acetoacetylated polyol with Component (i) (i.e., the degradation compound) to form (zz) a polyol compound. In another embodiment, the recovered raw material composition contains at least a portion of the acid solution that contacted the polyurethane material, and the process further comprises extracting water from the raw material composition.

The acid solution that is used in the acidolyisis process can comprise any acid compound provided that it has a pH of less than or equal to about 2. Suitable acid compounds that may be used include inorganic acids, oxoacids (e.g., sulfonic acid, carboxylic acids), acids with a negative pKa (e.g., methanesulfonic acid, para-toluenesulfonic acid, triflic acid, sulfuric add, nitric acid, and hydrochloric add), or combinations thereof. In certain embodiments, the acid solution may comprise other components in addition to the acid compound. These components can include water and/or (yy) one or more polyol compounds, such as those described in detail further below. In certain embodiments, the acid compound is miscible with Component (yy). As used herein, in connection with the acid compound, "miscible" means that the acid compound forms a homogenous mixture with Component (yy).

While it is desirable to submerge the entire polyurethane material to be decomposed into the acid solution, there are embodiments where only a portion of the polyurethane material is contacted with the acid solution. In these embodiments, the remaining portion of the polyurethane material (i.e., the portion that does not contact the acid solution) will not be decomposed. In other words, partial recycling of a polyurethane material is also contemplated by the present disclosure.

There are also a variety of ways to promote the acidolysis process and, ultimately, the decomposition of the polyurethane material into the various components comprising the recovered raw material composition. For example, once submerged in the acid solution, the polyurethane material may be agitated using techniques known in the art. Additionally, heat may be applied to one or both the acid solution and the polyurethane material to facilitate the acidolysis process. For example, the acid solution in which the polyurethane material is submerged may be heated to a temperature ranging from 60° C. to 100° C. Another technique that may be used to facilitate the decomposition of the polyurethane material is to place acid solution and polyurethane material into a vessel and placing the polyurethane material, which is submerged in the acid solution, under a vacuum. It should be noted that one or more of the techniques described in this paragraph may be used (alone or in combination) to facilitate the decomposition of the polyurethane material. While the total amount of time needed to decompose the polyurethane material into the recovered raw material composition may vary depending on a number of factors, such as the thickness of the polyurethane material, in certain embodiments, the entire decomposition process can take approximately four (4) to five (5) hours.

As a result of the acidolysis process, the polyurethane material disclosed herein is decomposed into a raw material composition that comprises Component (i) and, optionally, other raw materials that were used in the formation of the polyurethane material. Depending on the reactive ingredients used to form the polyurethane material, Component (i) can comprise an aldehyde compound, a ketone compound, or combinations thereof. In addition to Component (i), in certain embodiments, the raw material composition can comprise other components that can be used as raw materials/reactive ingredients in the formation of other materials. These other components can comprise: (ii) a hydroxy functional terminated urethane compound, (iii) a hydroxy containing compound, (iv) an auxiliary compound, or combinations thereof. In one embodiment, the process further comprises utilizing one or more of Components (i)-(iv) and (zz) as a raw material in the manufacture of another material. In another embodiment, the process for recycling a polyurethane material further comprises extracting one or more of Components (i)-(iv) and (zz) from the recovered raw material composition prior to it being utilized as the raw material and, optionally, additionally comprises extracting Component (i) from the recovered raw material composition prior to it being utilized as a raw material in the manufacture of another material.

Component (ii) will have a molecular weight that is less than the molecular weight of the polyurethane material. The molecular weight of Component (ii) can range from 1,000 to 6,000 (e.g., 1,500 to 5,000 or 2,000 to 3,000) depending on the location of the acidolysis susceptible moiety in the polymeric backbone of the polyurethane material. In certain embodiments, Component (ii) can have a linear or branched structure depending on the polymeric structure of the polyurethane material.

While Components (iii)-(iv) will be dependent on the type of raw materials that were originally used in the formation of the polyurethane material and whether the those raw materials were reacted with other components during polymerization, examples of the materials that may be recovered as Components (iii)-(iv) include the various isocyanate reactive and/or auxiliary compounds described below. In certain embodiments, Component (iii) and Component (yy) may be the same or a different type of polyol. The recovered materials, such as a recovered polyol compound, can then be used as a raw material to form other materials.

As stated above, the raw material composition comprises Components (i)-(iv). However, in certain instances, the presence of Component (i) is undesirable because it may adversely affect the properties of materials formed from one or more components of the raw material composition. In those situations, an acetoacetylated polyol may be introduced into the recovered raw material composition. The acetoacetylated polyol compound will react with Component (i) to form (zz) a polyol compound. In certain embodiments, Component (zz) is a different type of polyol compound when compared to Components (iii) and (yy). While Component (zz) can have any molecular weight greater than 50, in certain embodiments Component (zz) has a molecular weight ranging from 100 to 5000 and comprises at least one methylene moiety that is reactive toward Component (i).

The process of the present disclosure enables the conversion of certain polyurethane materials into a raw material compound that can be used as a reactive ingredient in the formation of another material, such as another type of polyurethane material. This process of recycling the original polyurethane material can lead to a significant decrease in the total amount of polyurethane materials ending up in a land fill. Additionally, the overall costs of manufacturing a material from the recycled raw materials disclosed herein may potentially be less than the cost of manufacturing the same material from non-recycled raw materials.

Polyurethane Material Susceptible to Acidolysis

The polyurethane material that is recycled in the disclosed process is a material that comprises a moiety that is capable of undergoing decomposition through acidolysis. The polyurethane material can be formed using techniques that are well known in the art, but in general, the polyurethane material is the reaction product of an isocyanate compound and an isocyanate reactive compound. Depending on the specific end-use application, the polyurethane material can further comprise other reactive ingredients (e.g., water) or other auxiliary ingredients that will be described in further detail below.

Isocyanate Compound

One or more isocyanate compounds can be used as a reactive ingredient to form the polyurethane material disclosed herein. In some embodiments, the isocyanate compound is a polyisocyanate compound. Suitable polyisocyanate compounds that may be used include aliphatic, araliphatic, and/or aromatic polyisocyanates. The isocyanate compounds typically have the structure R—(NCO)$_x$ where x is at least 2 and R comprises an aromatic, aliphatic, or combined aromatic/aliphatic group. Non-limiting examples of suitable polyisocyanates include diphenylmethane diisocyanate ("MDI") type isocyanates (e.g., 2,4', 2,2', 4,4'MDI or mixtures thereof), mixtures of MDI and oligomers thereof (e.g., polymeric MDI or "crude" MDI), and the reaction products of polyisocyanates with components containing isocyanate-reactive hydrogen atoms (e.g., polymeric polyisocyanates or prepolymers). Accordingly, suitable isocyanate compounds that may be used include SUPRASEC® DNR isocyanate, SUPRASEC® 2185 isocyanate, RUBINATE® M isocyanate, and RUBINATE® 1840 isocyanate, or combinations thereof. SUPRASEC® and RUBINATE® isocyanate compounds are available from Huntsman International LLC.

Other examples of suitable isocyanate compounds also include tolylene diisocyanate ("TDI") (e.g., 2,4 TDI, 2,6 TDI, or combinations thereof), hexamethylene diisocyanate ("HMDI" or "HDI"), isophorone diisocyanate ("IPDI"), butylene diisocyanate, trimethylhexamethylene diisocyanate, di(isocyanatocyclohexyl)methane (e.g. 4,4'-diisocyanatodicyclohexylmethane), isocyanatomethyl-1,8-octane diisocyanate, tetramethylxylene diisocyanate ("TMXDI"), 1,5-naphtalenediisocyanate ("NDI"), p-phenylenediisocyanate ("PPDI"), 1,4-cyclohexanediisocyanate ("CDI"), tolidine diisocyanate ("TODI"), or combinations thereof. Modified polyisocyanates containing isocyanurate, carbodiimide or uretonimine groups may also be employed as Component (i).

Blocked polyisocyanates can also be used as the isocyanate compound provided that the reaction product has a deblocking temperature below the temperature at which the isocyanate compound will react with the isocyanate reactive compound. Suitable blocked polyisocyanates can include the reaction product of: (a) a phenol or an oxime compound and a polyisocyanate, or (b) a polyisocyanate with an acid compound such as benzyl chloride, hydrochloric acid, thionyl chloride or combinations. In certain embodiments, the polyisocyanate may be blocked with the aforementioned compounds prior to introduction into the reactive ingredients/components used to form the polyurethane material.

Mixtures of isocyanates, for example, a mixture of TDI isomers (e.g., mixtures of 2,4- and 2,6-TDI isomers) or mixtures of di- and higher polyisocyanates produced by phosgenation of aniline/formaldehyde condensates may also be used as the isocyanate compound.

In some embodiments, the isocyanate compound is liquid at room temperature. A mixture of isocyanate compounds may be produced in accordance with any technique known in the art. The isomer content of the diphenyl-methane diisocyanate may be brought within the required ranges, if necessary, by techniques that are well known in the art. For example, one technique for changing isomer content is to add monomeric MDI (e.g., 2,4-MDI) to a mixture of MDI containing an amount of polymeric MDI (e.g., MDI comprising 30% to 80% w/w 4,4'-MDI and the remainder of the MDI comprising MDI oligomers and MDI homologues) that is higher than desired.

Isocyanate Reactive Compound

One or more isocyanate reactive compounds can be used as a reactive ingredient to form the polyurethane material disclosed herein. Any of the known organic compounds containing at least two isocyanate reactive moieties per molecule may be employed as isocyanate reactive compound. Polyol compounds or mixtures thereof that are liquid at 25° C., have a molecular weight ranging from 60 to 10,000 (e.g., 300 to 10,000 or less than 5,000), a nominal hydroxyl functionality of at least 2, and a hydroxyl equivalent weight of 30 to 2,000 (e.g., 30 to 1,500 or 30 to 800) can be used as Component as the isocyanate reactive compound.

Examples of suitable polyols that may be used as the isocyanate reactive compound include polyether polyols such as those made by addition of alkylene oxides to initiators, which containing from 2 to 8 active hydrogen atoms per molecule. In some embodiments, the aforementioned initiators include glycols, glycerol, trimethylolpropane, triethanolamine, pentaerythritol, sorbitol, sucrose, ethylenediamine, ethanolamine, diethanolamine, aniline, toluenediamines (e.g., 2,4 and 2,6 toluenediamines), polymethylene polyphenylene polyamines, N-alkylphenylene-diamines, o-chloro-aniline, p-aminoaniline, diaminonaphthalene, or combinations thereof. Suitable alkylene oxides that may be used to form the polyether polyols include ethylene oxide, propylene oxide, and butylene oxide, or combinations thereof.

Other suitable polyol compounds that may be used the isocyante reactive compound include Mannich polyols having a nominal hydroxyl functionality of at least 2, and having at least one secondary or tertiary amine nitrogen atom per molecule. In some embodiments, Mannich polyols are the condensates of an aromatic compound, an aldehyde, and an alkanol amine. For example, a Mannich condensate may be produced by the condensation of either or both of phenol and an alkylphenol with formaldehyde and one or more of monoethanolamine, diethanolamine, and diisopronolamine. In particular, embodiments, the Mannich condensates are those of phenol or nonylphenol with formaldehyde and diethanolamine. The Mannich condensates may be made by any known process. In some embodiments, the Mannich condensates serve as initiators for alkoxylation. Any alkylene oxide (e.g., those alkylene oxides mentioned above) may be used for alkoxylating one or more Mannich condensates. When polymerization is completed, the Mannich polyol comprises primary hydroxyl groups and/or secondary hydroxyl groups bound to aliphatic carbon atoms.

In certain embodiments, the polyols that are used as the isocyanate reactive compound are polyether polyols that comprise propylene oxide ("PO"), ethylene oxide ("EO"), or a combination of PO and EO groups or moieties in the polymeric structure of the polyols. These PO and EO units may be arranged randomly or in block sections throughout the polymeric structure. In certain embodiments, the EO content of the polyol ranges from 0 to 100% by weight based on the total weight of the polyol (e.g., 50% to 100% by weight). In some embodiments, the PO content of the polyol ranges from 100 to 0% by weight based on the total weight of the polyol (e.g., 100% to 50% by weight). Accordingly, in some embodiments, the EO content of a polyol can range from 99% to 33% by weight of the polyol while the PO content ranges from 1% to 66% by weight of the polyol. Moreover, in some embodiments, the EO and/or PO units can either be located terminally on the polymeric structure of the polyol or within the interior sections of the polymeric backbone structure of the polyol. Suitable polyether polyols include poly(oxyethylene oxypropylene) diols and triols obtained by the sequential addition of propylene and ethylene oxides to di- or trifunctional initiators that are known in the art. In certain embodiments, the isocyanate reactive compound is either the aforementioned diol or triol or, alternatively, the isocyanate reactive compound can comprise a mixture of these diols and triols.

The aforementioned polyether polyols also include the reaction products obtained by the polymerization of ethylene oxide with another cyclic oxide (e.g., propylene oxide) in the presence of polyfunctional initiators such as water and low molecular weight polyols. Suitable low molecular weight polyols include ethylene glycol, propylene glycol, diethylene glycol, dipropylene glycol, cyclohexane dimethanol, resorcinol, bisphenol A, glycerol, trimethylolopropane, 1,2,6-hexantriol, pentaerythritol, or combinations thereof.

Polyester polyols that can be used as the isocyanate reactive compound include polyesters having a linear polymeric structure and a number average molecular weight (Mn) ranging from about 500 to about 10,000 (e.g., preferably from about 700 to about 5,000 or 700 to about 4,000) and an acid number generally less than 1.3 (e.g., less than 0.8). The molecular weight is determined by assay of the terminal functional groups and is related to the number average molecular weight. The polyester polymers can be produced using techniques known in the art such as: (1) an esterification reaction of one or more glycols with one or more dicarboxylic acids or anhydrides; or (2) a transesterification reaction (i.e. the reaction of one or more glycols with esters of dicarboxylic acids). Mole ratios generally in excess of more than one mole of glycol to acid are preferred so as to obtain linear polymeric chains having terminal hydroxyl groups. Suitable polyester polyols also include various lactones that are typically made from caprolactone and a bifunctional initiator such as diethylene glycol. The dicarboxylic acids of the desired polyester can be aliphatic, cycloaliphatic, aromatic, or combinations thereof. Suitable dicarboxylic acids which can be used alone or in mixtures generally have a total of from 4 to 15 carbon atoms include succinic, glutaric, adipic, pimelic, suberic, azelaic, sebacic, dodecanedioic, isophthalic, terephthalic, cyclohexane dicarboxylic, or combinations thereof. Anhydrides of the aforementioned dicarboxylic acids (e.g., phthalic anhydride, tetrahydrophthalic anhydride, or combinations thereof) can also be used. In some embodiments, adipic acid is the preferred acid. The glycols used to form suitable polyester polyols can include aliphatic and aromatic glycols having a total of from 2 to 12 carbon atoms. Examples of such glycols include ethylene glycol, 1,2-propanediol, 1,3-propanediol, 1,3-butanediol, 1,4-butanediol, 1,5-pentanediol, 1,6-hexanediol, 2,2-di methyl-1,3-propanediol, 1,4-cyclohexanedimethanol, decamethylene glycol, dodecamethylene glycol, or combinations thereof.

Additional examples of suitable polyols that may be used as the isocyanate reactive compound include hydroxyl-terminated polythioethers, polyamides, polyesteramides, polycarbonates, polyacetals, polyolefins, polysiloxanes, and simple glycols such as ethylene glycol, butanediols, diethylene glycol, triethylene glycol, the propylene glycols, dipropylene glycol, tripropylene glycol, and mixtures thereof.

In certain embodiments, the isocyanate reactive compound used to form the polyurethane material is a polyol comprising an acetal moiety, an orthoester moiety, or combinations thereof. If an acetal moiety is desired in the polyol, then a reactive mixture comprising a polyol compound and a divinyl ether compound may be used to form the acetal containing polyol. If an orthoester moiety is desired in the polyol, then a reactive mixture comprising a polyol compound and a diketene acetal compound may be used to form the orthoester moiety containing polyol. If a polyol comprising both an acetal moiety and an orthoester moiety is desired, then a reactive mixture comprising a polyol compound, a divinyl ether compound, and diketene acetal compound may be used to form the acetal and orthoester containing polyol. Suitable polyol compounds that can be used as component to form the acetal and/or orthoester moiety containing polyol include any of the various polyols described above while: (a) suitable divinyl ether compounds include: tri (ethylene glycol) divinyl ether, di(ethylene glycol) divinyl ether, 1,4-Butanediol divinyl ether, 1,4-Cyclohexanedimethanol divinyl ether; and (b) suitable diketene acetal compounds include 3,9-diethylidene-2,4,8,10-tetraoxaspiro[5.5]undecane, 3,9-dimethylene-2,4,8,10-tetraoxaspiro[5.5]undecane, or combinations thereof. In some embodiments, the acetal and/or orthoester containing polyol is formed by reacting (optionally, in the presence of a catalyst) a molar excess of component (a) to component (b).

Water

In addition to the isocyanate and isocyanate reactive compounds described above, the reactive composition used to form the polyurethane material disclosed herein may comprise water. The addition of water to the reactive mixture will be dependent on the ultimate end-use application of the polyurethane material. While water can be considered an isocyanate reactive compound, for purposes of this disclosure water shall be considered a distinct component from the isocyanate compound. In other words, depending on the specific end-use application, the reactive mixture used to form the polyurethane material can include the isocyanate reactive compound and water.

Any type of purified water can be used as a reactive ingredient provided it has been filtered or processed to remove impurities. Suitable types of water include distilled water and water that has been purified via one or more of the following processes: capacitive deionization, reverse osmosis, carbon filtering, microfiltration, ultrafiltration, ultraviolet oxidation, and/or electrodeionization.

Auxiliary Compounds/Additives

The reactive mixture used to form the polyurethane material disclosed herein may comprise one or more auxiliary compounds/additives that are routinely used in the manufacture of polyurethane materials. The auxiliary compounds may be added directly into the reactive composition that is used to form the polyurethane material and are typically selected to impart certain qualities to the reactive composition and/or to the polyurethane material that is formed therefrom.

Suitable additives that may be used in the added to or otherwise used in connection with the reactive composition include surfactant, fire retardants, smoke suppressants, cross-linking agents, viscosity reducer, infra-red pacifiers, cell-size reducing compounds, pigments, fillers, reinforcements, mold release agents, antioxidants, dyes, pigments, antistatic agents, biocide agents, blowing agents, or combinations thereof.

Examples of suitable flame retardants that may be used in the reactive composition include organo-phosphorous compounds (e.g., organic phosphates, phosphites, phosphonates, polyphosphates, polyphosphites, polyphosphonates), ammonium polyphosphates (e.g., triethyl phosphate, diethy ethyl phosphonate, and tris(2-chloropropyl)-phosphate); and halogenated fire retardants (e.g., tetrabromophthalate esters and chlorinated parrafins).

In certain embodiments, the surfactants used in the reactive composition can comprise one or more silicone or non-silicone based surfactants. These surfactants are typically used to control the size of the cells that form as the foam composition reacts to form the polyurethane foam product thereby allowing for the control of the internal cell structure of the foam product. In certain embodiments, a foam comprising a uniform set of small sized cells (e.g., <300 µm) is desired because the foam will exhibit outstanding physical properties (e.g., compressive strength and thermal conductivity properties). Additionally, the aforementioned surfactants will also assist in the stabilization of the internal cells thereby ensuring that the cells do not collapse as the composition reacts to form the polyurethane foam product.

Examples of suitable silicone surfactants that may be used in the reactive composition include polyorganosiloxane polyether copolymers and polysiloxane polyoxyalkylene block co-polymers (e.g., Momentive's L-5345, L-5440, L-6100, L-6642, L-6900, L-6942, L-6884, L-6972 and Evonik Industries AG's DC-193, DC5357, Si3102, Si3103, Tegostab 8490; 8496, 8536; 84205; 84210; 84501; 84701, 84715). Others silicone surfactants that can be used also are disclosed in U.S. Pat. No. 8,906,974 and U.S. Patent Publication No. US 2016/0311961.

Examples of suitable non-silicone surfactants that may be used in the reactive composition include non-ionic, anionic, cationic, ampholytic, semi-polar, zwitterionic organic surfactants. Suitable non-ionic surfactants include phenol alkoxylates and alkylphenol alkoxylates (e.g., ethoxylated phenol and ethoxylated nonylphenol, respectively). Other useful non-silicone non-ionic surfactants include LK-443 (available from Evonik Industries AG) and VORASURF 504 (available from Dow Chemicals).

Examples of other suitable additives that may be used in the reactive composition include triethanolamine and glycerol cross linking agents; propylene carbonate and 1-methyl-2-pyrrolidinone viscosity reducers; carbon black, titanium dioxide, and metal flake infra-red opacifiers; inert, insoluble fluorinated compounds, and perfluorinated cell-size reducing compounds; calcium carbonate fillers; glass fibers and/or ground up foam waste reinforcing agents; zinc stearate mold release agents; butylated hydroxy toluene antioxidants; azo-/diazo dyestuff and phthalocyanines pigments.

As stated above, the reactive composition used to form the polyurethane material disclosed herein can include one more catalyst. These catalysts can include amine-based catalyst compounds, non-amine-based catalyst compounds, or combinations thereof.

Examples of suitable amine-based catalyst compounds that may be used in the reactive composition include compounds comprising at least one tertiary group include bis-(2-dimethylaminoethyl)ether (e.g., JEFFCAT® ZF-20 catalyst), N,N,N'-trimethyl-N'-hydroxyethylbisaminoethylether (e.g., JEFFCAT® ZF-10 catalyst), N-(3-dimethylaminopropyl)-N,N-diisopropanolamine (e.g., JEFFCAT® DPA catalyst), N,N-dimethylethanolamine (e.g., JEFFCAT® DMEA catalyst), blends of N,N-dimethylethanolamine aniethylene diamine (e.g., JEFFCAT® TD-20 catalyst), N,N-dimethylcyclohexylamine (e.g., JEFFCAT® DMCHA catalyst), N-methyldicyclohexylamine (e.g., POLYCAT 12 available from Evonik Industries AG), benzyldimethylamine (e.g., JEFFCAT® BDMA catalyst), pentamethyldiethylenetriamine (e.g., JEFFCAT® PMDETA catalyst), N,N,N',N'',N'''-pentamethyldipropylenetriamine (e.g., JEFFCAT® ZR-40 catalyst), N,N-bis(3-dimethylaminopropyl)-N-isopropanolamine (e.g., JEFFCAT® ZR-50 catalyst),N'-(3-(dimethylamino)propyl-N,N-dimethyl-1,3-propanediamine (e.g., JEFFCAT® Z-130 catalyst), 2-(2-dimethylaminoethoxy) ethanol (e.g., JEFFCAT® ZR-70 catalyst), N,N,N'-trimethylaminoethyl-ethanolamine (e.g., JEFFCAT® Z-110 catalyst; DABCO T), N-ethylmorpholine (e.g, JEFFCAT® NEM catalyst), N-methylmorpholine (e.g., JEFFCAT® NMM catalyst), 4-methoxyethylmorpholine, N,N'dimethylpiperzine (e.g., JEFFCAT® DMP catalyst), 2,2'dimorpholinodiethylether (e.g., JEFFCAT® DMDEE catalyst), 1,3,5-tris(3-(dimethylamino)propyl)-hexahydro-s-triazine (e.g., JEFFCAT® TR-90 catalyst), 1-Propanamine, 3-(2-(dimethylamino)ethoxy); substituted imidazoles (e.g., 1-methylimidazole, 1,2-dimethlyimidazol (e.g., DABCO 2040 available from Evonik Industries AG and TOYOCAT DM70 available from Tosho Corporation), 1-methyl-2-hydroxyethylimidazole (e.g., N-(3-aminopropyl)imidazole, 1-n-butyl-2-methylimidazole, 1-iso-butyl-2-methylimidazole, N,N'-dimethylpiperazines), bis-substituted piperazines (e.g., aminoethylpiperazine, N,N',N'-trimethyl aminoethylpiperazine or bis-(N-methyl piperazine)urea), N-methylpyrrolidines and substituted methylpyrrolidines (e.g., 2-aminoethyl-N-methylpyrrolidine or bis-(N-methylpyrrolidine)ethyl urea), 3-dimethylaminopropylamine, N,N,N'',N''-tetramethyldipropylenetriamine, tetramethylguanidine, 1,2-bis-diisopropanol, or combinations thereof. Other examples of amine catalysts include N-alkylmorpholines, N-butylmorpholine and dimorpholinodiethylether, N,N'-dimethylaminoethanol, N,N-dimethylamino ethoxyethanol, bis-(dimethylaminopropyl)-amino-2-propanol, bis-(dimethylamino)-2-propanol, bis-(N,N-dimethylamino)ethylether, N,N,N'-trimethyl-N'hydroxyethyl-bis-(aminoethyl)ether, N,N-dimethyl amino ethyl-N'-methyl amino ethanol, tetramethyliminobispropylamine, N,N-dimethyl-p-toluidine, diethyltoluenediamine (Ethacure 100), 3,5-dimethylthio-2,4-toluenediamine (Ethacure 300); poly(oxypropylene)triamine (e.g., JEFFAMINE® T-5000 catalyst) reactive acid blocked catalysts (e.g., phenolic acid salt of 1,8-diazabicyclo(5,4,0)undecene-7, JEFFCAT® LED and JEFFCAT® ZF brand catalysts), or combinations thereof. As used herein, JEFFCAT® catalysts are all available from Huntsman Corporation.

Examples of suitable non-amine-based catalyst compounds that may be used in the reactive composition include organo-metallic compounds (e.g., organic salts of transition metals such as titanium, iron, nickel), post-transition metals (e.g., zinc, tin and bismuth), alkali metals (e.g., lithium, sodium and potassium), alkaline earth metals (e.g., magnesium and calcium), ferric chloride, ferric acetylacetonate, zinc salts of carboxylic acids, zinc 2-ethylhexanoate, stannous chloride, stannic chloride, tin salts of carboxylic acids, dialkyl tin salts of carboxylic acids, tin (II) 2-ethylhexanoate, dibutyltin dilaurate (e.g., DABCO T-12 available from Evonik Industries AG), dimethyltin dimercaptide (e.g., FOMREZ UL-22 available from Momentive Performance Materials Inc.), bismuth (III) carboxylate salts (e.g., bismuth (2-ethylhexanote)), bismuth neodecanoate (DABCO MB-20 available from Evonik Industries AG), bismuth pivalate, bismuth-based catalysts (e.g., the compounds identified in US Patent Pub. No. 016/020888), 1,1',1'',1'''-(1,2-ethanediyldinitrilo)tetrakis[2-propanol] neodecanoate complexes (e.g., BICAT 8840 available from Shepherd Chemicals Co.), 2,2',2'',2'''-(1,2-ethanediyldinitrilo)tetrakis [ethanol] neodecanoate complexes (e.g., BICAT 8842 available from Shepherd Chemicals Co.), K-KAT XC-C227 bismuth salt (available from King Industries), sodium acetate, sodium N-(2-hydroxy-5-nonylphenol)methyl-N-methylglycinate (e.g., JEFFCAT® TR52 catalyst), bismuth (2-ethylhexanote)), or combinations thereof.

In certain embodiments, the reactive composition used to manufacture the polyurethane may comprise a trimerization catalyst. Suitable trimerization catalysts include potassium salts of carboxylic acids (e.g., potassium acetate, potassium pivlate, potassium octoate, potassium triethylacetate, potassium neoheptanoate, potassium neooctanoate), quaternary ammonium carboxylates (e.g., (2-hydroxypropyl)trimethylammonium 2-ethylhexanoate ("TMR"), (2-hydroxypropyl) trimethylammonium formate ("TMR-2"), tetramethylammonium pivalate, tetramethylammonium triethylacetate, TOYOCAT TRX (available from Tosoh, Corp)), or combinations thereof.

As stated above, the reactive composition may comprise one or more blowing agents. While water can be used as a blowing agent in the reactive composition, other blowing agents that may be used in the reactive composition (either in combination with water or in substitution of water) include halogenated olefin ("HFO") compounds. Examples of suitable HFO compounds that may be used in the reactive composition include hydrohaloolefins such as trifluoropropenes, tetrafluoropropenes (e.g., tetrafluoropropene (1234)), pentafluoropropenes (e.g., pentafluoropropene (1225)), chlorotrifloropropenes (e.g., chlorotrifloropropene (1233)), chlorodifluoropropenes, chlorotrifluoropropenes, chlorotetrafluoropropenes, hexafluorobutenes (e.g., hexafluorobutene (1336)), or combinations thereof. In certain embodiments, the tetrafluoropropene, pentafluoropropene, and/or chlorotrifloropropene compounds used as Component (vi) has no more than one fluorine or chlorine substituent connected to the terminal carbon atom of the unsaturated carbon chain (e.g., 1,3,3,3-tetrafluoropropene (1234ze); 1,1,3,3-tetrafluoropropene, 1,2,3,3,3-pentafluoropropene (1225ye), 1,1,1-trifluoropropene, 1,2,3,3,3-pentafluoropropene, 1,1,1,3,3-pentafluoropropene (1225zc), 1,1,2,3,3-pentafluoropropene (1225yc), (Z)-1,1,1,2,3-pentafluoropropene (1225yez), 1-chloro-3,3,3-trifluoropropene (1233zd), 1,1,1,4,4,4-hexafluorobut-2-ene (1336mzzm), or combinations thereof).

Other blowing agents that may be used in combination with the HFOs described above include air, nitrogen, carbon dioxide, hydrofluorocarbons ("HFCs"), alkanes, alkenes, mono-carboxylic acid salts, ketones, ethers, or combinations thereof. Suitable HFCs include 1,1-difluoroethane (HFC-152a), 1,1,1,2-tetrafluoroethane (HFC-134a), pentafluoroethane (HFC-125), 1,1,1,3,3-pentafluoropropane (HFC-245fa), 1,1,1,3,3-pentaflurobutane (HFC-365mfc), or combinations thereof. Suitable alkanes and alkenes include n-butane, n-pentane, isopentane, cyclopentane, 1-pentene, or combinations thereof. Suitable mono-carboxylic acid salts include methyl formate, ethyl formate, methyl acetate, or combinations thereof. Suitable ketones and ethers include acetone, dimethyl ether, or combinations thereof.

Acetoacetylated Polyol

As stated above, an acetoacetylated polyol compound is used in the process disclosed herein. In certain embodiments, the acetoacetylated polyol is the reaction product of an acetoacetyl functional monomer with a polyether polyol compound, such as the polyether polyol compounds listed above. Suitable acetoacetyl functional monomers that may be used include tert-butyl acetoacetate, benzyl acetoacetate, di-tert-butyl 1,3-acetonedicarboxylate, or combinations thereof.

In certain embodiments, the acetoacetylated polyol comprises up to 40% acetoacetyl functional groups based on available hydroxyl groups in the acetoacetylated polyol. In other embodiments, the acetoacetylated polyol can have a molecular weight ranging from 100 to 6,000 (e.g., 500 to 5,000, 1,000 to 3,000, 1,500 to 2,500).

Modifications

While specific embodiments of the disclosure have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosure which is to be given the full breadth of the claims appended and any and all equivalents thereof. Therefore, any of the features and/or elements which are listed above may be combined with one another in any combination and still be within the breadth of this disclosure.

The process disclosed herein is further illustrated by the following examples in which parts are by weight unless otherwise specified.

EXAMPLES

Materials/Compounds Used in the Examples:
Additive 1: SAG 47 silicon base defoamer available from Momentive Performance Materials Inc.
Additive 2: NIAX L 3001 surfactant available from Momentive Performance Materials Inc.
Additive 3: TEGOSTAB B8409VE surfactant available from Evonik Industries AG
Additive 4: TEGOSTAB B 8466 surfactant available from Evonik Industries AG
Catalyst 1: JEFFCAT® TD 33A amine catalyst available from Huntsman Corporation
Catalyst 2: Amine catalyst Jeffcat DPA
Catalyst 3: JEFFCAT® ZR-10 catalyst available from Huntsman Corporation
Catalyst 4: JEFFCAT® ZR-50 catalyst available from Huntsman Corporation
DVE-3: tri(ethylene glycol) divinyl ether
Isocyanate 1: Polymeric MDI
Isocyanate 2: MDI prepolymer
JEFFCAT® DMCHA: N,N-dimethylcyclohexylamine available from Huntsman Corporation
JEFFOL® FX 31-167: polyether polyol available from Huntsman Corporation
JEFFOL® 30-650: polyoxypropylene triol initiated polyol available from Huntsman Corporation
JEFFOL® PPG-400: polyether polyol available from Huntsman Corporation
JEFFOL® PPG 230: polyether polyol available from Huntsman Corporation
KOH: Potassium hydroxide
p-TSA: Para-toluene sulfonic acid
Polyol 1: Hydrolyzable Polyol
Polyol 2: Hydrolyzable Polyol
Polyol 3: Ethylene glycol
t-BAA: tert-Butyl acetoacetate
t-Butanol: tert-butanol Preparation and Degradation of Hydrolyzable Polyol and Polyurethane Materials Example 1

About 291.7 grams (1.45 eq) of JEFFOL® PPG-400 was dried overnight using molecular sieves to remove residual moisture. The Freshly dried JEFFOL® PPG-400 was added to a 2000 ml four neck round bottom flask fitted with a nitrogen inlet, a mixing shaft, a thermocouple, and an addition funnel. A catalytic amount (0.1 g) of para-toluene sulfonic acid monohydrate was added and the mixture was heated to 40° C. with stirring to dissolve the p-TSA. The addition funnel was charged with 110.0 g (1.09 eq) of DVE-3, and the drop-wise addition of DVE-3 was started with mixing. Reaction begin immediately on the start of DVE-3 addition. 30-minutes after the DVE-3 addition was complete, 0.45 g of JEFFCAT® DMCHA was added to neutralize the p-TSA to prevent premature and unwanted hydrolysis of the polyol. The reaction product was slight yellow and had 630 cps viscosity, and Ohv # of 76.

The polyol component and the isocyanate component were mixed with one another by means of high speed mixing, and then transfer to mold cavity for cure according to the Mixing Specification 1. The isocyanate index was kept at 135 and the reaction mixtures were cured at 120° C. for 20 minutes to achieve a soft, elastomeric polyurethane material.

| Mixing specifications 1 | | |
|---|---|---|
| Polyol 1 | 100 | Parts by weight |
| Catalyst 1 | 0.2 | Parts by weight |
| Additive 1 | 0.1 | Parts by weight |
| Additive 2 | 0.3 | Parts by weight |
| Isocyanate 1 | 23.12 | Parts by weight |

The average Ohv of the polyol blend is 78 mg KOH/grams

About 42 grams of PU material were added to a solution prepared by equal quantities of JEFFOL® PPG 230 and water (250 grams each), and 20 grams of p-TSA in a 2-liter round bottom flask equipped with a condenser, nitrogen inlet, and an overhead stirrer. The solution was heated to 60° C. under stirring and a clear solution was obtained after 4 hours containing degraded polyol, acid, water, and JEFFOL® PPG 230. A 50-grams of 0.5N KOH solution was added to the solution to neutralized acid in solution followed by vacuum stripping at 40° C. to remove water from the polyol system.

Example 2

The process is carried out as in Example 1 but using higher functional polyol to produce high functional hydrolyzable polyol.

Freshly dried 27.0 grams (0.134 eq) of JEFFOL® PPG-400 and 45 grams (0.134 eq) of JEFFOL® FX 31-167, and a catalytic amount of p-TSA (0.1 gram) were added to a 200-ml erlenmeyer flask equipped with a magnetic stirring device. The solution was heated to 40° C. under stirring till the acid completely dissolved into polyol blend. The reaction was started by adding pre-dried 20.2 gram (0.2 eq) of DVE-3 through an addition funnel as describe in Example 1. After neutralizing the residual acid in product mixture, a clear and viscous liquid product was recovered with a viscosity of 5321 cps and hydroxyl number of 59.

Starting from Mixing Specification 2, the polyol component and the isocyanate component were mixed with one another by means of high speed mixing, and then transfer to a container to produce a flexible foam polyurethanes material. The isocyanate index was kept at 80 to achieve the flexible foam polyurethane material.

| Mixing specification 2 | | |
| --- | --- | --- |
| Polyol 2 | 98 | Parts by weight |
| Polyol 3 | 2 | Parts by weight |
| Additive 3 | 0.1 | Parts by weight |
| Additive 4 | 0.15 | Parts by weight |
| Catalyst 2 | 0.18 | Parts by weight |
| Catalyst 3 | 0.15 | Parts by weight |
| Catalyst 4 | 0.15 | Parts by weight |
| Water | 2.10 | Parts by weight |
| Isocyanate 2 | 46.20 | Parts by weight |

The average Ohv of the polyol blend is 213 mg KOH/grams

The degradation procedure of PU flexible foam was analogous to the example 1. However, the flexible PU foam only partially degrade in the solution (~75%). As observed, the hard block formation in polyurethane foam by urea reaction and ethylene glycol reaction with isocyanate was not dissolve during this process.

Preparation of Acetoacetylized Polyol

Example 3

162.01 grams of JEFFOL® 30-650, and 118.62 grams (calculated amount for 40% acetoacetylation based on of available hydroxyl groups) of t-BAA were charged to a 2000 ml three-neck round bottom flask equipped with a nitrogen inlet, thermocouple with a temperature controller, a condenser with a collection flask, and an overhead stirrer. Acetoacetylation reaction proceed under nitrogen stream at 140 C, 30.7 grams tert-Butanol was collected at the end of 4 hours, when the reaction was terminated in the event of no further distillate and assumed completed. The theoretical amount of t-Butanol should be distilled as 55.49 grams. Product was degassed in a vacuum oven at 70 C for 2 hours to remove any further volatiles. Reduced viscosity with acetoacetylation of polyol resulted due to inclusion of a bulky pendant group, which increase separation between polymer chains.

The acetoacetylated polyol were then blend together with degraded polyol system containing free aldehydes. The blend was based on 2:1 mole ratio of active methylene group presented in acetoacetylized polyol to free acetaldehyde present in degraded polyol, as it takes two moles of active methylene groups to remove one mole of acetaldehyde. About 50 grams of polyol containing 750 ppm (0.001 moles) of free aldehyde was blended with approximately 1 gram of acetoacetylized polyol (>0.02 moles) to strip aldehyde from the solution. After 15 days, the free aldehyde content in solution reduce to less than 10 ppm.

What is claimed is:

1. A process for recycling a polyurethane material wherein the polyurethane material comprises a moiety that is capable of undergoing decomposition through acidolysis, the process comprising:
   contacting the polyurethane material with an acid solution and allowing at least a portion of the polyurethane material to decompose into a recovered raw material composition comprising a degradation compound ("Component (i)"), wherein Component (i) is an aldehyde compound, a ketone compound, or combinations thereof; and
   introducing an acetoacetylated polyol into the recovered raw material composition and reacting the acetoacetylated polyol and Component (i) to form a polyol compound ("Component (zz)").

2. The process according to claim 1, wherein the recovered raw material composition further comprises: a hydroxy functional terminated urethane compound ("Component (ii)"), a hydroxy containing compound that is different from Component (ii) ("Component (iii)"), an auxiliary compound ("Component (iv)"), or combinations thereof.

3. The process according to claim 2, wherein the process further comprises utilizing one or more of Components (i)-(iv) and (zz) as a raw material in the manufacture of another material.

4. The process according to claim 2, wherein the process further comprises extracting one or more of Components (i)-(iv) from the recovered raw material composition prior to it being utilized as a raw material in the manufacture of another material.

5. The process according to claim 1, wherein the acid solution comprises an acid compound, water, and a polyol compound ("Component (yy)").

6. The process according to claim 5, wherein the acid compound is miscible with Component (yy).

7. The process according to claim 5, wherein the recovered raw material composition contains at least a portion of the acid solution that contacted the polyurethane material, and the process further comprises extracting water from the raw material composition.

8. The process according to claim 1, wherein the process further comprises utilizing one or more of Components (i) and (zz) as a raw material in the manufacture of another material.

9. The process according to claim 1, wherein the process further comprises extracting Component (i) from the recovered raw material composition prior to it being utilized as a raw material in the manufacture of another material.

10. The process according to claim 1, wherein the process comprises submerging at least a portion of the polyurethane material into the acid solution.

11. The process according to claim 1, where the entire polyurethane material is submerged into the acid solution.

12. The process according to claim 1, wherein the process further comprises agitating the polyurethane material during acidolysis to promote the decomposition of the polyurethane material.

13. The process according to claim 1, wherein the process comprises applying heat to the polyurethane material during acidolysis to promote decomposition of the polyurethane material.

14. The process according to claim 1, wherein the process comprises conducting the acidolysis under vacuum to promote the decomposition of the polyurethane material.

15. The process according to claim 1, wherein the polyurethane material comprises acetal moieties in its polymeric backbone.

16. The process according to claim 1, wherein the polyurethane material is the reaction product of an isocyanate compound and an isocyanate reactive compound wherein the isocyanate reactive compound comprises a polyol compound comprising an acetal moiety, an orthoester moiety, or combinations thereof.

17. The process according to claim 1, wherein the polyurethane material is the reaction product of an isocyanate compound and an isocyanate reactive compound wherein the isocyanate reactive compound is the reaction product of: (a) a polyol compound, and (b) a divinyl ether compound, wherein component (a) is in molar excess to component (b).

18. The process according to claim 1, wherein the acetoacetylated polyol is the reaction product of an acetoacetyl functional monomer with a polyether polyol compound.

19. The process according to claim 1, where the acetoacetylated polyol comprises up to 40% acetoacetyl functional groups based on available hydroxyl groups in the acetoacetylated polyol.

* * * * *